United States Patent
Feinberg et al.

(10) Patent No.: US 6,615,660 B1
(45) Date of Patent: Sep. 9, 2003

(54) REAL-TIME SELF-COMPENSATING GRAVITY GRADIOMETER INSTRUMENT

(75) Inventors: Melvin Feinberg, Huntington, NY (US); Andrew Grierson, Youngstown, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/987,729

(22) Filed: Nov. 15, 2001

Related U.S. Application Data (60) Provisional application No. 60/273,546, filed on Mar. 7, 2001.

(51) Int. Cl.[7] .............................. G01M 1/12; G01V 7/00
(52) U.S. Cl. ..................................... 73/382 R; 73/1.01
(58) Field of Search .............................. 73/383, 382 R, 73/382 G, 510, 1.01; 702/141, 152, 2

(56) References Cited

U.S. PATENT DOCUMENTS 3,599,492 A * 8/1971 Kalmus et al. ........... 73/382 G
5,357,802 A * 10/1994 Hofmeyer et al. ......... 73/382 G
6,079,267 A *  6/2000 Hull ......................... 73/382 R
6,125,698 A * 10/2000 Schweitzer et al. ....... 73/382 G

* cited by examiner

Primary Examiner—Helen Kwok
(74) Attorney, Agent, or Firm—Wallace G. Walter (57) ABSTRACT

A real-time self-compensating gravity gradiometer (GGI) of the type having an input plane (IP) includes a mass concentration (MC) that is moved along an orbital path (16) in the input plane (IP) to cause a positionally varying gravity perturbation in the gradiometer near field that causes a corresponding signal output. The characteristics of the perturbation function are quantifiable and compared to the corresponding output function of the gradiometer (GGI). The differences between the quantified perturbation function and the gradiometer (GGI) output function represents an aggregate instrument error that is processed into an error reducing or compensation function to improve gradiometer (GGI) accuracy and signal-to-noise ratio.

27 Claims, 7 Drawing Sheets

$$\Gamma_{NF} = \frac{2 U_{gc} MR}{(R^2 - r^2)^2}$$

$$\underline{F} = \frac{U_{gc} m_1 m_2}{|\underline{d}|^2} \cdot \frac{\underline{d}}{|\underline{d}|} \qquad (1)$$

$$\underline{F} = \frac{U_{gc} M_1 \underline{d}}{|\underline{d}|^3} \qquad (2)$$

$$(\underline{R} - \underline{r}) \qquad (\underline{R} + \underline{r}) \qquad (3)$$

$$\underline{F} = \frac{U_{gc} M_1 (\underline{R} - \underline{r})}{|(\underline{R} - \underline{r})|^3} \qquad \underline{F} = \frac{U_{gc} M_1 (\underline{R} + \underline{r})}{|(\underline{R} + \underline{r})|^3} \qquad (4)$$

$$\underline{F} = \frac{U_{gc} M_1 (\underline{R} - \underline{r}) \cdot \hat{\underline{a}}}{|(\underline{R} - \underline{r})|^3} \qquad \underline{F} = \frac{U_{gc} M_1 (\underline{R} + \underline{r}) \cdot \hat{\underline{a}}}{|(\underline{R} + \underline{r})|^3} \qquad (5)$$

$$\Gamma_{NF} = \frac{U_{gc} M}{2 |\underline{r}|} \left\{ \frac{(\underline{R} - \underline{r}) \cdot \hat{\underline{a}}}{|(\underline{R} - \underline{r})|^3} - \frac{(\underline{R} + \underline{r}) \cdot \hat{\underline{a}}}{|(\underline{R} + \underline{r})|^3} \right\} \qquad (6)$$

$$\Gamma_{NF} = \frac{U_{gc} M}{2 r} \left\{ \frac{1}{(R - r)^2} - \frac{1}{(R + r)^2} \right\} \qquad (7)$$

$$\Gamma_{NF} = \frac{2 U_{gc} M R}{(R^2 - r^2)^2} \qquad (8)$$

REAL-TIME SELF-COMPENSATING GRAVITY GRADIOMETER INSTRUMENT

CROSS REFERENCE TO PROVISIONAL PATENT APPLICATION

This application claims the benefit of the filing date of U.S. Provisional Patent Application No. 60/273,546 filed Mar. 7, 2001, now abandoned, by the applicants herein.

BACKGROUND OF THE INVENTION

The present invention relates to a real-time self-compensating gravity gradiometer instrument of the type used to measure local variations in gravity in order to determine the gravity gradient.

Various instruments have been developed to measure gravity, these instruments include gravimeters and gradiometers.

Gravimeters are typically of the uniaxial type and measure the gravity field along the local vertical. A known type of gravimeter uses lasers and a high-precision clock to time a mass (typically, a reflective object) as it falls between two vertically spaced points in an evacuated space. More sophisticated types of these systems as disclosed, for example, in U.S. Pat. No. 5,351,122 to Niebauer et al., use split-beam interferometers to provide increased accuracy.

In contrast, gradiometers measure the differential curvature or ellipticity of gravity equipotential surfaces, the rate of change of the increase of gravity in the horizontal direction, and/or the rate of increase of gravity in the vertical direction.

The above mentioned Niebauer gravimeter can be used to measure the gravity gradient by separating two gravimeters by a known distance "d" with the gravity gradient obtained by:

$$(g_1-g_2)/d$$

Such a multi-gravimeter device is classified as and is referred to as an Absolute Gravity Gradiometer.

Another type of contemporary gravity gradiometer utilizes plural pairs of torque-balance accelerometers that are moved at a constant velocity along an orbital path about a spin axis. Information from each accelerometer at any angular position in the orbit provides information as to the lateral acceleration sensed by the accelerometers.

Figure 9:
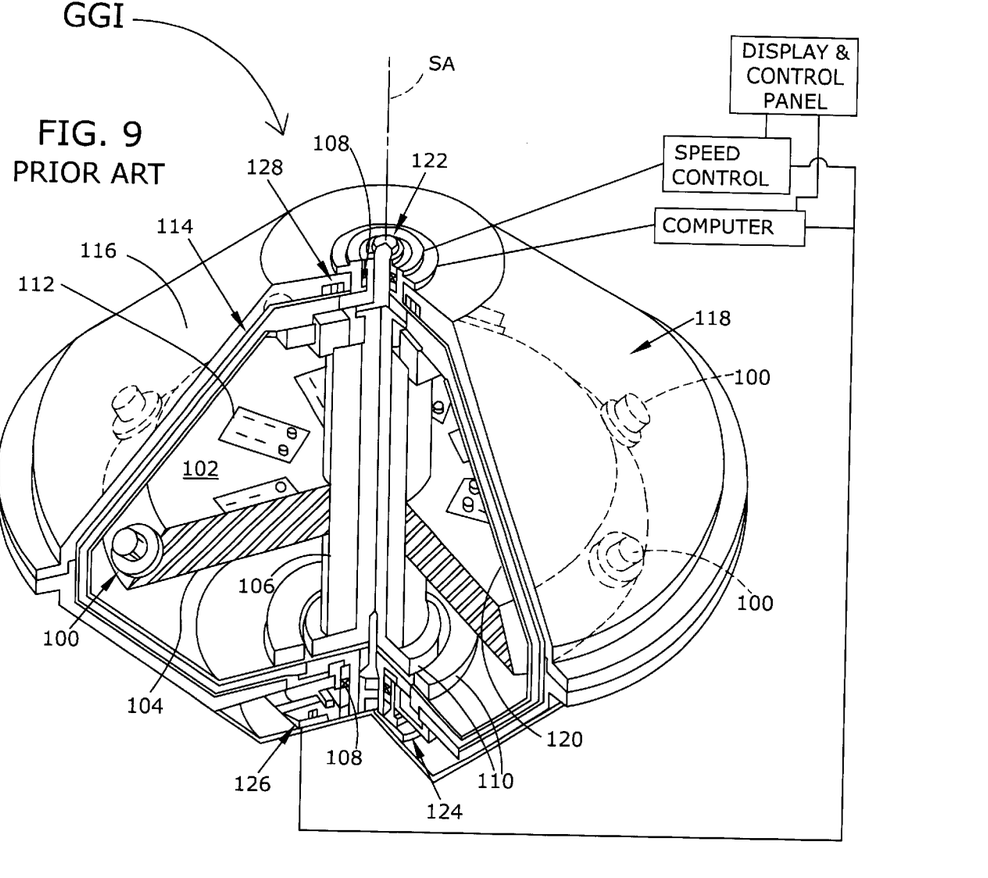
FIG. 9 is an isometric view of an exemplary gravity gradiometer suitable for use in the present context with selected portions thereof broken away for reasons of clarity.

An exemplary gravity gradiometer suitable for use in the context of the present invention is shown in its basic form in FIG. 9. This gradiometer is sold by the Lockheed Martin corporation (Niagara Falls N.Y. USA) and is described in more detail in U.S. Pat. No. 5,357,802 issued Oct. 25, 1994 to Hofmeyer and Affleck and entitled "Rotating Accelerometer Gradiometer," the disclosure of which is incorporated herein by reference.

As shown in FIG. 9, the gravity gradiometer instrument GGI includes eight accelerometers 100 mounted at a common radius and equi-spaced about the periphery of a rotor assembly 102 that is rotated at a constant and controlled angular velocity about a spin axis SA. The rotor assembly 102 includes the rotor 104 carried on a support shaft 106 for rotation therewith. The rotor assembly 102 is rotatably mounted in ball bearings 108 and, in turn, carried in a flex-mount assembly 110. Processing electronics 112 are mounted on the rotor 104 adjacent each accelerometer 100 for processing the respective accelerometer output signal. An inner housing 114 contains the rotor assembly 102 and is designed to rotate with the rotor assembly 102. An outer housing 116 contains the interior components and includes one or more heaters 118 designed to operate the instrument at some controlled temperature above ambient and also includes a magnetic-field shield 120. A slip ring assembly 122 at the upper end of the mounting shaft 106 provides the electrical/signal interface with the rotor assembly 102 and the active devices thereon. A shaft encoder 124 at the lower end of the mounting shaft 106 cooperates with an encoder pick-off 126 to provide rotary position information. The output of the encoder pick-off 126 is provided to a computer and speed controller, which, in turn, controls a drive motor 128 at the upper end of the unit to provide a controlled rotary velocity.

The gradiometer includes an internal linear servo-controlled actuator that imparts a 2 Hz sinusoidal acceleration to each accelerometer pair to enable biasing and compensation of various errors including the $g^2$ rectification error. In addition, the gradiometer is mounted on an external vibration isolation system that a assists in attenuating higher frequency vibration.

Each accelerometer 100 provides a sinusoidally varying analog output that is a function of the acceleration experienced by each accelerometer as the accelerometer orbits the spin axis SA. For a gradiometer having its spin axis SA aligned along the field lines in an ideally uniform and unperturbed gravity field, each accelerometer experiences the same acceleration forces as its proceeds along its orbital path. However, when the local gravity field is perturbed by the presence of one or more masses and/or the spin axis SA is tilted relative to the local vertical field lines, each accelerometer will experience different accelerations throughout its orbit. Gradiometers can be positioned with their spin axis vertical (SAV), their spin axis horizontal (SAH), or at an 'umbrella' angle in which the spin axis is tilted 35 degrees from the local vertical. The quantitative output of each rotating accelerometer pair, when summed and differenced, can be used to provide information related to the local gravity gradient field.

A gravity gradiometer of the type described above is known as a "relative" instrument since the torque-balance accelerometers used in the instrument intrinsically do not measure gravity directly as in the case of a ballistic pendulum or a "free-fall" dropping mass device. The instrument only provides an output voltage or a series digital pulses proportioned to the sensed field as the accelerometer pairs move along their circular orbit about the rotation axis. Additionally, a gradiometer configured with relative measurement accelerometers must be calibrated before field deployment.

Calibration of a gradiometer of this type is effected by introducing a precision, constant rotational rate input which creates a centripetal gravity gradient whose magnitude in Eotvos Units (EU) is given by the approximation $\Theta^2/40$. The scale factor of the instrument is determined by dividing the signal output of the instrument in either analog volts or digital pulses per second by the computed magnitude of the acceleration gradient. This requires the instrument to be installed in a gyro-stabilized platform where a precision torquing signal is provided to rotate the gravity gradiometer instrument at programmed rates.

Because of the mechanical and electrical instabilities of the linear torque balance accelerometers contained in the rotating accelerometer gradiometer (including time-dependent changes in materials and electrical circuits), the instrument is subject to 'drift' errors by which the instrument goes out of calibration. While, to a certain extent, the drift characteristic for an instrument can be determined and electrically compensated, relative gradiometers used for direct measurement of the gravity gradient must always be monitored (if possible) to determine if they are operating within calibration limits and, of course, re-calibrated periodically.

In contrast, a falling-body gravimeter or gradiometer of the types described above are classified as "absolute" instruments since the measurements are based upon direct application of Newtonian physics (i.e., $s=\frac{1}{2}(g)t^2$) and the output of such an instrument is a measure of a fundamental physical constant. Thus, the falling-body gravimeter and/or gradiometer need not be subject to a stringent calibration procedure as required for a rotating-accelerometer gradiometer as described above.

In order for a gradiometer to support natural resource and/or geophysical information, it must have a signal-determining accuracy at least in the one Eotvos Unit range (i.e., $10^{-9}$ (cm/sec$^2$)/cm or $2.54 \times 10^{-6}$ $\mu$/inch) or less with a resolution accuracy in the 1–3 pico-g range. Noise sources can arise from within the instrument itself and from sources outside the instrument, especially in those cases where the instrument is mounted on a moving vehicle (i.e. motor vehicle, ship, or aircraft).

Intra-instrument noise, processing errors, and non-linearity sources can include accelerometer scale-factor variations, control loop non-linearities and instabilities, mechanical vibrations arising from motors and bearings, electromagnetic field affects, changes in voltage(s), current flow(s), and the like along with changes consequent to temperature, pressure, and humidity variations. In those cases where the instrument is carried in a moving vehicle, it is not uncommon to mount the instrument in a vibration-isolated, gyro-stabilized platform to provide a measure of inertial stability and to isolate the instrument from the motions and vibrations of the vehicle. As can be appreciated, residual errors, not fully taken out by the gyro-stabilized platform, can also introduce further undesirable effects that affect instrument performance. While substantial efforts have been made to identify error sources and non-linearities and eliminate or minimize these error sources, a real-time gradiometer self-compensation/calibration system has yet to be achieved for a rotating accelerometer gravity gradiometer.

SUMMARY OF THE INVENTION

In view of the above, it is an object of the present invention, among others, to provide a real-time self-compensating gravity gradiometer instrument.

It is another object of the present invention to provide a real-time self-compensating gravity gradiometer instrument in which a gravity perturbation of known characteristics functions to compensate the instrument. 0020 In view of these objects, and others, the present invention provides a real-time self-compensating gravity gradiometer instrument in which a known mass concentration is moved in a predictable manner in the instrument near field to provide quantifiable gravity perturbations that affect the instrument output. That portion of the time-varying signal output of the instrument that corresponds to the time-varying perturbations induced by the mass concentration are compared with a pre-determined or pre-calculated time-varying reference function with the difference value between the measured and the pre-calculated functions representing the aggregate or cumulate instrument-specific error contribution to the measured signal. Once this instrument-specific error contribution is determined, the instrument output is subject to a correction or calibration step to remove or otherwise attenuate the instrument-specific error from the gravity measurements to provide an increase in the signal-to-noise ratio.

In its most general form, a known mass concentration is moved along a path in pre-determined manner in the instrument sensing field, preferably its near field, to present a near-field gravity perturbation. The time-varying change in the local gravity field is calculated using Newtonian principles with this calculated value functioning as a calibration or reference standard that is compared with the corresponding signal output of the instrument. The difference between the calculated change in the local gravity field consequent to the movement of the mass concentration and that actually measured by the instrument is a function of the cumulative instrument error contribution. That cumulative instrument error contribution is then used to effect a correction or compensation of the instrument output to provide a more accurate measurement of the desired gravity gradient.

In a preferred form, a mass having known dimensions, density, and center of mass is orbited at a known radius about the instrument sensing axis and in the instrument sensing plane to provide an orbiting near-field gravity perturbation. Since the physical characteristics of the orbiting mass concentration are known, the gravity perturbation caused by the orbiting mass concentration is quantifiable as a time-varying function. That portion of the output signal corresponding to the position-varying gravity perturbation is extracted from the instrument output and compared to the theoretically-determined value; the difference thereof is a function of the aggregation of error sources in the instrument and is used to effect a compensation of the instrument output to increase the signal-to-noise ratio.

The present invention advantageously provides a real-time self-compensating gravity gradiometer instrument in which gravity perturbations of known value are used to maintain instrument calibration.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
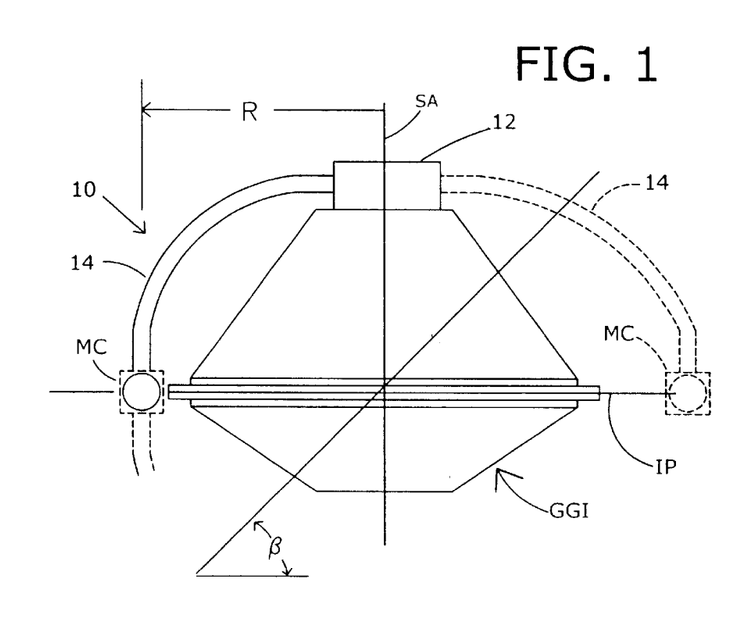
FIG. 1 is a side elevation view of an exemplary self-compensating gravity gradiometer instrument in accordance with the present invention.

A gravity gradiometer instrument GGI is shown in general form in FIG. 1 and is designated by the reference character GGI. The gravity gradiometer GGI shown corresponds to a known instrument, such as the type described above in relationship to FIG. 9. Instruments of that type typically utilize 4×n accelerometers (n=1, 2, 3, . . . ) arranged in pairs from which sums and differences are taken to achieve a common mode rejection of linear and rotary vibrations. Any gravity gradiometer having the general functional characteristics of that described above can be used in the context of the present invention.

As shown in FIG. 1, the gravity gradiometer GGI includes an input plane IP and a spin axis SA that is aligned in a vertical direction. It is about this spin axis SA that the various accelerometer pairs (not shown in FIG. 1) are rotated to sense lateral gravity components in the input plane IP that is normal to the spin axis SA. While the gravity gradiometer GGI is shown in FIG. 1 with its spin axis SA vertical (i.e., SAV), the device can be oriented with the spin axis SA at non-vertical alignments, including the horizontal alignment (i.e., SAH) and the previously-mentioned umbrella alignment.

A reference-mass assembly 10 is mounted to the top-most portion of the gravity gradiometer GGI and includes a precision speed-controlled motor drive 12 and a support arm 14 that extends outwardly and downwardly from the drive motor 12. A mass concentration MC is positioned at the distal end of the support arm 14 and within the input plane IP, preferably with the center of mass of the mass concentration MC lying within the input plane IP. The mass concentration MC can take the form of the spheroid shown in solid-line illustration or some other form including the right parallelipiped shown in dotted-line illustration. In the preferred form of the invention, the mass concentration MC is fabricated from a dense material, such as depleted uranium or tungsten, and has a mass of between one and six pounds. If desired, the value of the mass of the mass concentration MC can be compared with or calibrated relative to a standard mass by the National Institute of Standards and Technology. As shown in dotted-line illustration, an additional support (unnumbered) can be connected to the underside of the mass concentration MC and further connected to a similar bearing-type structure on the bottom end of the gravity gradiometer GGI (not specifically shown). As explained below, other various structural arrangements can be provided to positionally maintain the mass concentration MC in the input plane IP while the mass concentration MC is moved about or otherwise transited in the input plane IP from one position to another. As represented in dotted-line illustration on the right side of FIG. 1, the mass concentration MC can be positioned at one of several different radii from the spin axis SA.

Figure 2:
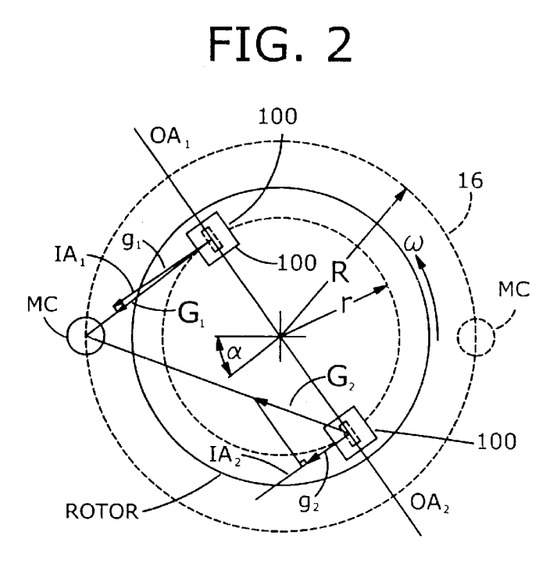
FIG. 2 is an idealized top view, in schematic form, of the mass concentration in relationship to the proof masses of the two diametrically opposite accelerometers mounted on a rotating disc.
Figure 3:
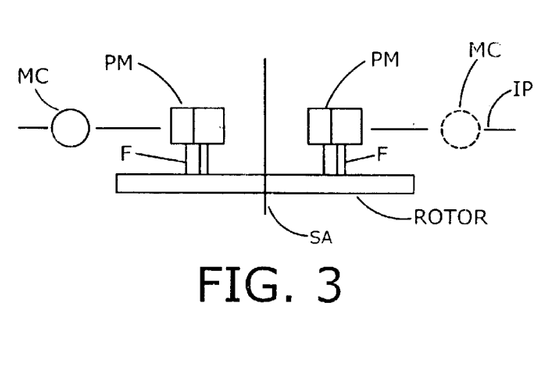
FIG. 3 is an idealized view elevational view of the proof masses of two diametrically opposite accelerometers of FIG. 2.

As shown in FIG. 2, two diametrically opposed accelerometers, indicated in schematic fashion at 100, are shown mounted on a rotor at a radius "r" from the spin axis SA. The accelerometers 100 are moved in a circular path about the spin axis SA as discussed above in the context of FIG. 9. As shown in both FIG. 2 and 3, each accelerometer includes a proof mass PM (shown as a right parallelipiped) carried atop a flexure F that allows the proof mass PM to respond to changes in the gravity field.

The motor 12 transports the mass concentration MC at a constant angular velocity $\omega$ along a circular orbit 16 within the input plane IP at a selected radius R from the instrument spin axis SA. In FIG. 2, the mass concentration MC is shown as orbiting in a counterclockwise direction; however, a clockwise direction is equally suitable. The motor 12 is controlled, for example, by direct digital control or by a servo loop, to provide a precise and accurate angular velocity $\omega$. Preferably, the mass concentration MC orbits the instrument spin axis SA at an angular velocity $\omega$ in a range of a fraction of to several tens of Hz or more. In addition, a rotary position encoder, such as a shaft angle resolver or an optical shaft encoder (not specifically shown), known to those skilled in the art, provides an output representing the instantaneous angular position $\alpha$ of the mass concentration MC as it transits its orbit 16.

In FIGS. 1 and 2, the orbit 16 is shown as circular and also shown as normal to the spin axis SA. If desired, the orbit 16 can be tilted relative to the spin axis SA (i.e., at the angle $\beta$ shown in FIG. 1) and can be non-circular.

As the drive motor 12 causes the mass concentration MC to orbit the gravity gradiometer GGI, the mass concentration MC perturbs the local gravity field. As shown in an idealized and representative manner in FIG. 2, the mass concentration MC creates gravity vectors $G_1$ and $G_2$ in the input plane IP at each angular position $\alpha$ with each gravity vector extending along a straight line path connecting the center of the mass concentration MC and the center of each proof mass PM. Accordingly, the accelerometers, revolving about the spin axis SA, within the gravity gradiometer GGI, sense changes in the near-field gravity gradient and output sinsusoidally varying gravity vectors $G_1$ and $G_2$. As explained below in relationship to FIG. 7, the gravity gradient is measured by resolving the mass attraction vectors of $G_1$ and $G_2$ into components $g_1$ and $g_2$. The components $g_1$ and $g_2$ are parallel to each accelerometer input axis IA and perpendicular to each accelerometer output axis OA.

Figure 4:
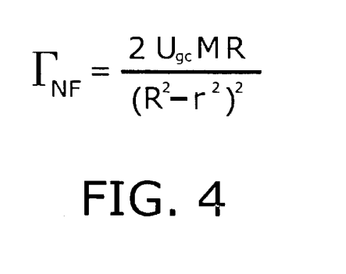
FIG. 4 is an equation relating the near-field gravity gradient, the universal gravity constant, the mass of a mass concentration, and the distance of the mass concentration from a sensing axis established by a pair of accelerometers.

The relationship between the near-field gravity gradient, the universal constant, the mass of the mass concentration MC, and the distance between the mass concentration MC from the input axis defined by the rotating accelerometer pair is presented in FIG. 4 in which $\Gamma_{NF}$ represents the near field gradient in Eotvos Units (1EU=$10^{-9}$ (cm/sec$^2$)/cm), $U_{gc}$ is the universal gravity constant (6.6732×$10^{-11}$ Newton-Meters$^2$)/Kg$^2$), M is the mass of the mass concentration MC in pounds (#), and R is the distance in feet between the mass concentration MC and the spin axis SA of the gravity gradiometer GGI, and r is the radius of the distance between the accelerometer pairs.

Figure 10:
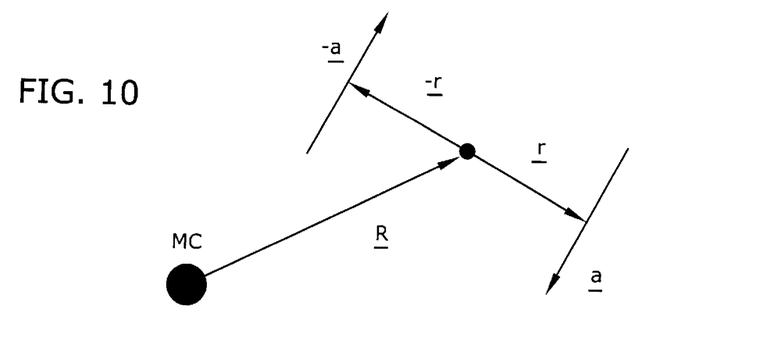
FIG. 10 is a diagramtic model that illustrates the relationship between of the near-field gravity gradient, the universal constant, the mass of the mass concentration MC, the distance (R) of the mass concentration MC, and the radii (r) between a pair of accelerometers.
Figure 11:
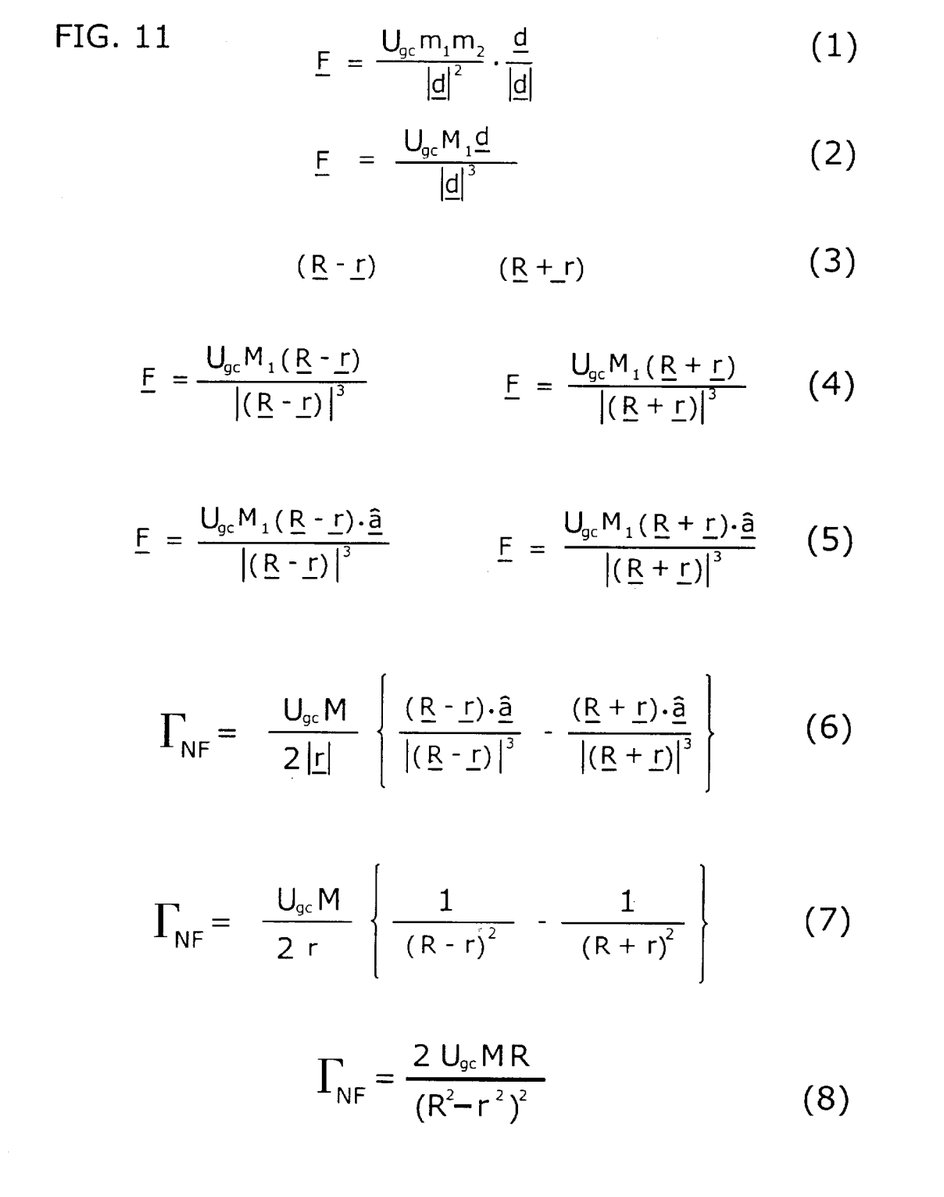
FIG. 11 is a derivation of the equation of FIG. 4.

The FIG. 4 equation is derived in accordance with FIGS. 10 and 11. FIG. 10 illustrates a mass concentration MC at a vector distance (R) from the central point of rotation of the accelerometers, with one accelerometer spaced a vector distance (r) from the central point of rotation and the other accelerometer spaced a vector distance (−r) from the central point of rotation.

The gravitational attractive force vector (F) between two point masses is inversely proportional to the square of the separation distance and lies along the straight line between them (d) and is related by the universal gravitational constant ($U_{gc}$) as represented by equation (1) in FIG. 11. The specific force (the force per unit mass) created by a mass disturbance (MC) experienced by the proof mass of an accelerometer is as represented by equation (2) in FIG. 11. As shown in FIG. 10, the vector distances from the proof mass of each of the accelerometers are the vector sums from the mass concentration MC to the central point and from the central point to each accelerometer as represented by the relationships of equations (3) in FIG. 11. Using the vector distances of equations (3) in conjunction with the specific force equation (2), the total vector forces experienced at the accelerometers is shown by the relationships in equation set (5) of FIG. 11.

Each accelerometer senses only the component of specific force that lies along its sensitive input axis (a). In the configuration shown in FIG. 10, the sensitive axes of both accelerometers are in the same geometrical orientation but placed such that their input axes are of opposite polarity.

The specific forces sensed by the accelerometers are then the vector dot products of the total force vectors and the unit sensitive axes â and −â are given by the relational equation set (5) of FIG. 11. The instrument interprets the sum of these oppositely pointing specific force measurements, divided by the distance therebetween, as the near field gravitational gradient ($\Gamma_{nf}$). Since the distance between the two accelerometers is $2|r|$, the near field gradient $\Gamma_{nf}$ is shown in equation (6) of FIG. 11 with equation (7) representing only the radial gradient when the mass concentration is rotated in the plane of the accelerometer pairs (as is the case shown in FIGS. 1 and 2) to yield the relationship shown in equation (8) of FIG. 11 and in FIG. 4.

Solution of the FIG. 4 equation for a one pound mass at a radius R of one foot and a GGI radius r of 7.5 cm between a pair of accelerometers yields a near-field effect of $\Gamma_{NF}$= 2.43 EU.

Figure 5:
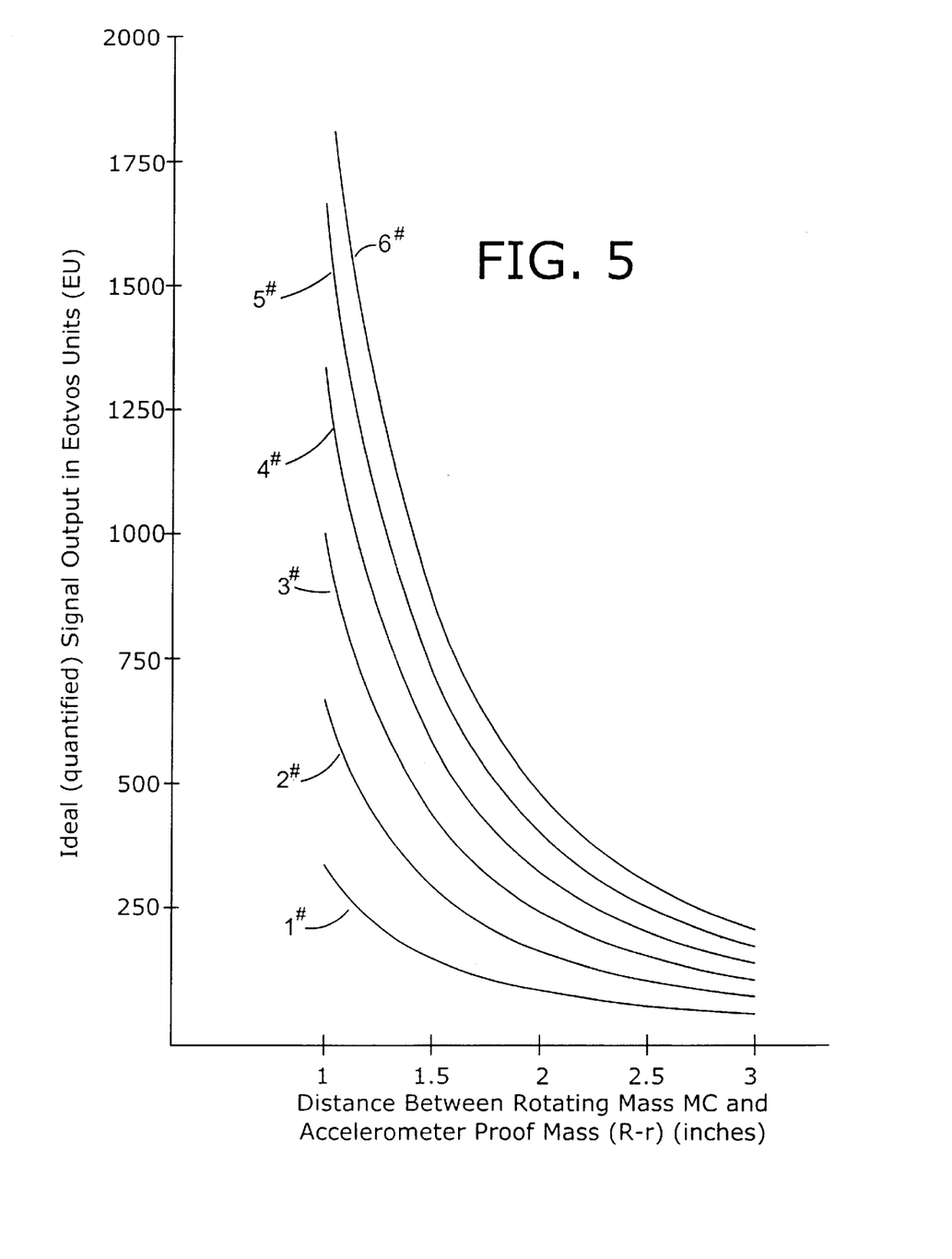
FIG. 5 is first graphical illustration of the relationship of the mass of a mass concentration and the resulting gravity perturbation with increasing distance from the instrument spin axis in which the ordinate represent Eotvos Units (EU) and the abscissa represents increasing distance R from the gravity gradiometer input axis.
Figure 6:
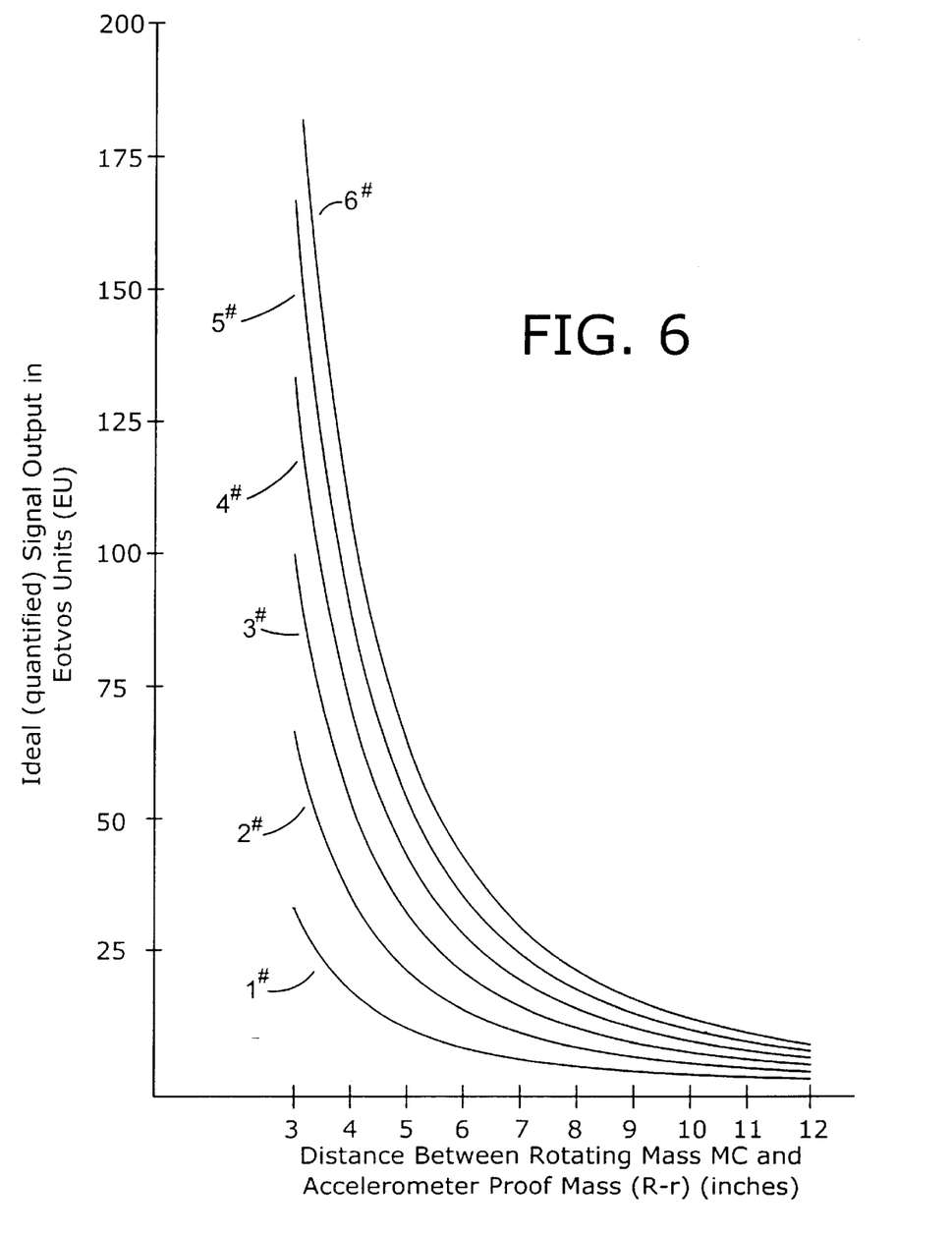
FIG. 6 is second graphical illustration of the relationship of the mass of a mass concentration and the resulting gravity perturbation with increasing distance R from the instrument spin axis in which the ordinate represent Eotvos Units (EU) and the abscissa represents increasing distance R from the gravity gradiometer input axis.

FIGS. 5 and 6 are graphical representations of the interrelationship of the mass of the mass concentration MC, the differential distance between the mass concentration MC from the input axis of the accelerometer pair (abscissa), and the change in the near-field gradient value in Eotvos Units (ordinate). As shown in FIG. 5, in which the various curves represent mass concentrations of between about one and six pounds (#'s) with differential spacing varying from one and three inches, a variation between about 31 EUs and a maximum of about 1840 EUs is shown. In the case of FIG. 6 and using the same mass concentration distributions as for FIG. 5 and for differential distances of between three and 12 inches, a variation of between about 1.12 EU and 185 EU is indicated.

As can be appreciated, increasing mass M with decreasing radius R creates a near-field gradient that, in the case of the preferred Lockheed Martin gravity gradiometer, can be measured with an adequate signal-to-noise ratio since the noise "floor" for a typical instrument is between 0.5 and 1.0 EU rms. Since the computed time-varying gravity gradient for the orbiting mass concentration MC is explicitly quantifiable by established Newtonian principles, its time-varying function can be viewed as an invariant calibration standard or benchmark.

Figure 7:
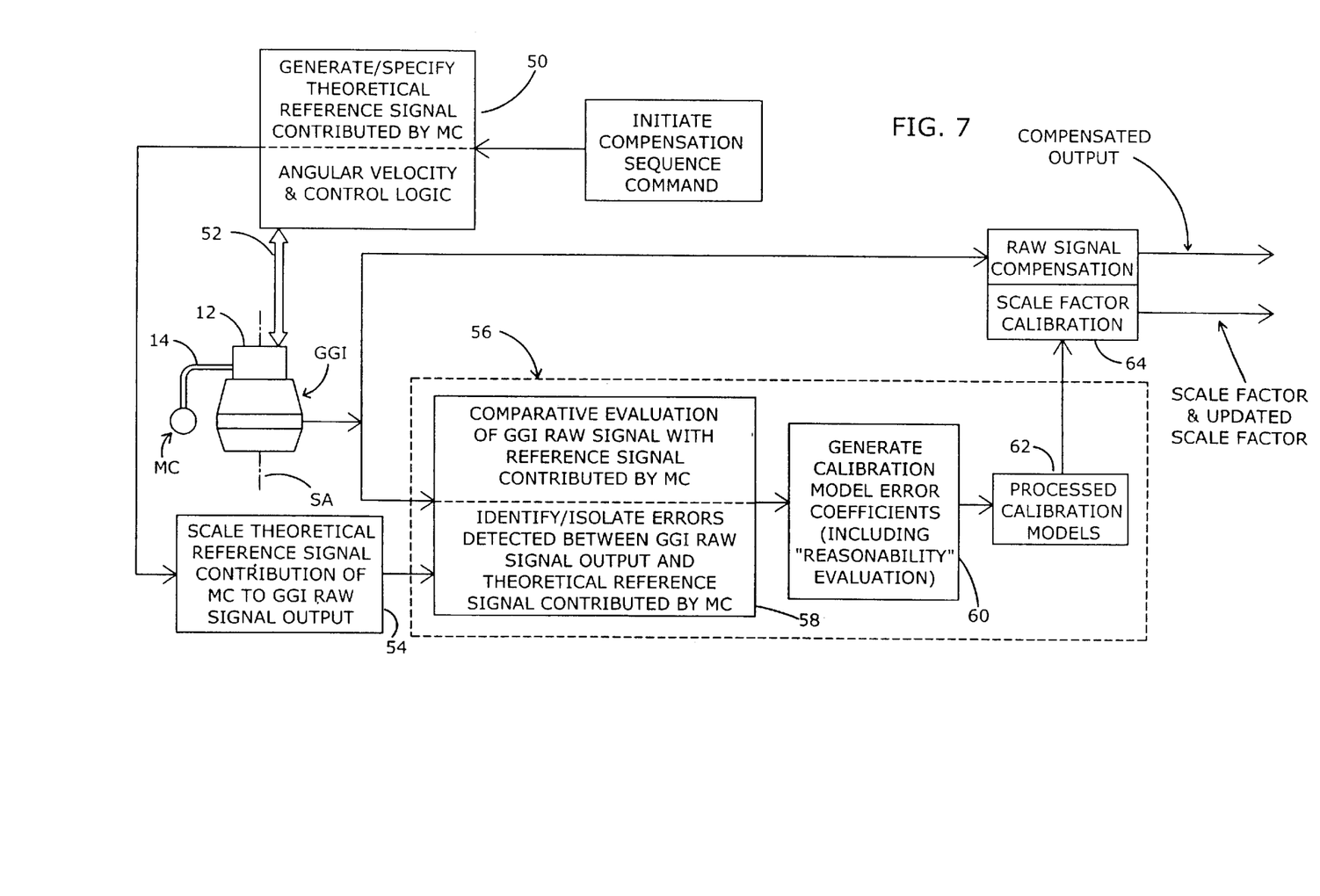
FIG. 7 is a functional block diagram of the signal processing pathway of the output of the gravity gradiometer instrument by which the aggregate error contribution of the instrument is determined.

The signal output of the gravity gradiometer GGI is processed in accordance with the functional block diagram of FIG. 7. In FIG. 7, the gravity gradiometer GGI shown is functionally the same as that of FIG. 9 and within the family of gradiometer instruments sold by Lockheed Martin.

The gravity gradiometer GGI provides a 'raw' signal output as a time-varying sinusoidally waveform that is a function of the rotational velocity of the rotating accelerometers within the device and a function of the ambient gravity gradient and a function of the moving gravity perturbation caused by the movement of the mass concentration MC. Since the angular velocity ω and the angular position α is known at all times and the phase relationship between the moving gravity perturbation and the accelerometers are known at all times, that portion of the output signal contributed by the near-field orbiting mass concentration MC can be extracted from the 'raw' output signal. The extraction can be by Fourier transform, wavelet analysis, or digital extraction. Once that component of the instrument output signal that is "driven" by and is a function of the orbiting mass concentration MC is extracted from the instrument output spectrum, a comparison is made between that measured function and the theoretical function (based upon the known physical characteristics of the mass concentration MC and its spacing from the instrument). The result of the comparison is an indicator of the aggregate error contributed by the gravity gradiometer GGI. Thereafter, the output signal is subject to a compensation step to, in effect, null out the instrument error contribution.

In FIG. 7, the gravity gradiometer GGI is connected to a functional block 50 via a bus 52; the functional block 50 provides angular velocity and control logic to the drive motor 12 to cause the mass concentration MC to transit its orbit 16 about the gravity gradiometer GGI. The functional block 50 also includes the quantitative values of the reference function contributed by the mass concentration MC.

The output of the function block 50 is provided to a second functional block 54 that provides a pre-processing scale factor determination for the reference signal. The scale-factor adjusted output of the functional block 54 and the raw signal output of the gravity gradiometer GGI are provided to a data processing unit 56. As shown in functional block 58, data processing is initially addressed by effecting a comparative evaluation of the raw signal from the gravity gradiometer GGI and the reference signal contributed by the mass concentration MC to identify the error value between these two signals. Thereafter, in functional block 60, a calibration model with calibration coefficients is generated with an indication of the 'reasonability' of the calibration model. In those cases where the calculated calibration model in functional block 60 is outside of predetermined constraints (i.e., an 'unreasonable' model), an appropriate signal is provided to the system operator. The processed calibration model (functional block 62) is then used to effect a compensation of the raw signal (at functional block 64) to provide the error-compensated and accuracy enhanced output.

The signal processing of FIG. 7 can be effected by discrete solid-state functional devices, by software- or firmware-controlled microprocessors or computers, by an application specific integrated circuit (ASIC), or by any combination thereof.

It is the differences between the calibration function (determined by Newtonian rules) and the corresponding mass concentration MC "driven" output of the gravity gradiometer GGI that represents the aggregate of the various errors and non-linearities introduced by the instrument itself. Once this difference is determined, that difference, representing the error contribution, is processed into a calibration/correction function that is then applied to the gravity gradient output to null out or otherwise compensate for the instrument-introduced errors and non-linearities. An optimally effective nulling of the instrument-introduced errors and non-linearities will yield an instrument output spectrum that includes an accurate representation of the gravity gradient and any residual irreducible "white" noise. In addition, the orbiting mass concentration MC provides an expeditious on-line, real-time scale-factor calibration approach by inputting a precisely known gradient disturbance and measuring the corresponding signal output. The scale factor, which is computed by dividing the voltage output by the gradient input in either (volts/g) or pulses per second/g (pps/g) can be consistently updated to limit any scale factor instability or drift errors.

The value of the mass of the mass concentration MC and its orbit radius R are empirically determined for each type of gradiometer. For example, a relatively small mass at a relatively large radius provides an output with a signal-to-noise ratio that may to be too low, and, conversely, a relatively large mass at a relatively small radius may provide an output with a signal-to-noise ratio that is so high that the noise component may be too small to be of value for instrument compensation. In general, an instrument output with a clearly discernible signal that is a function of the orbiting gravity perturbation and with a clearly discernible noise component is desired.

Figure 8:
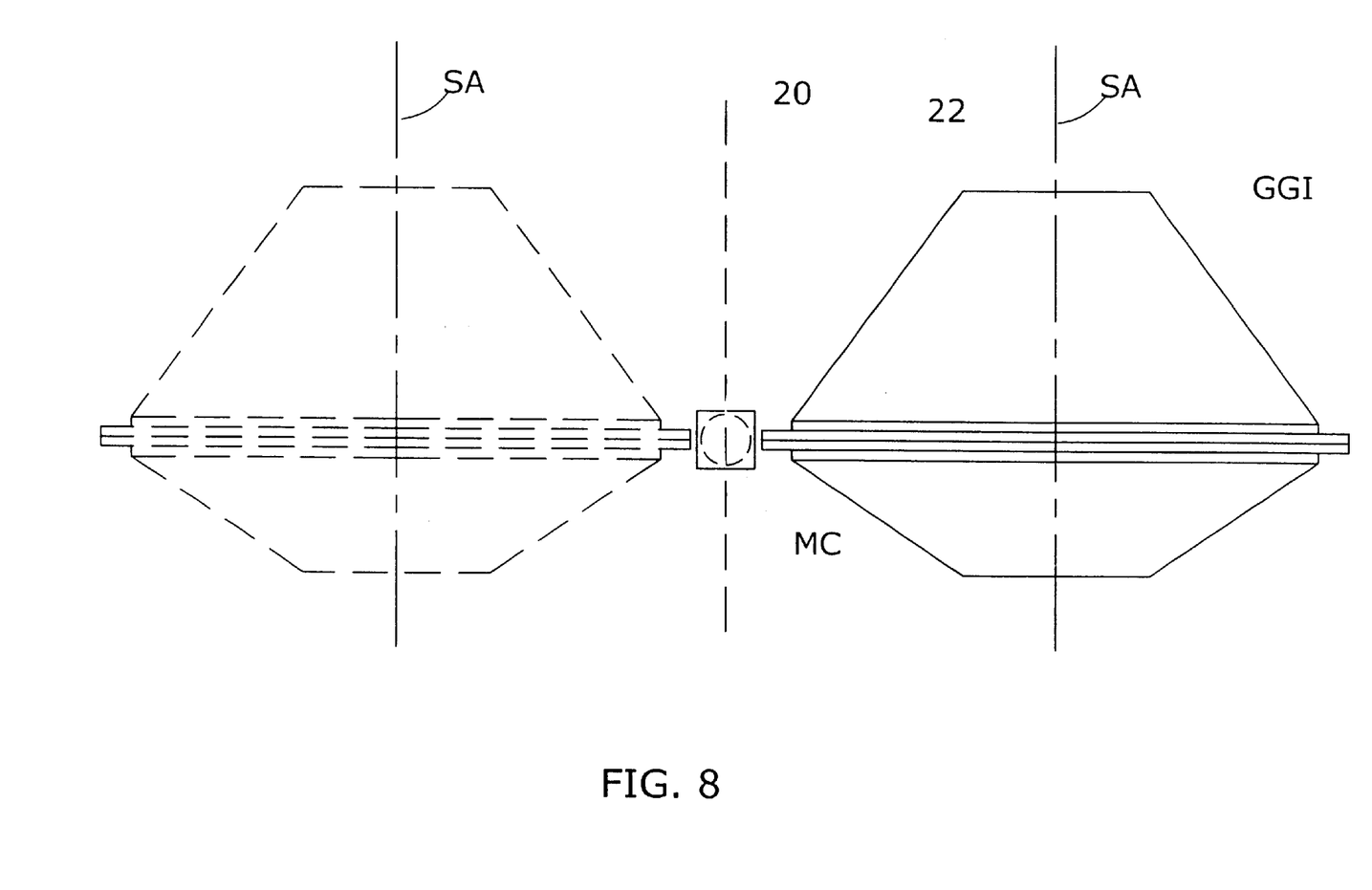
FIG. 8 represents different path-variants for the mass concentration including a variant in which the mass concentration oscillates or reciprocates between two instruments.

As can be appreciated, the mass concentration MC can be transited at different discrete speeds or in a time-varying manner. Thus, the mass concentration MC can be moved in a clockwise or counterclockwise direction at various speeds and with the orbit normal to the spin axis SA as illustrated or at some tilt angle β (FIGS. 1 and 8). Since error sources within the gravity gradiometer GGI may be different in different frequency regimes, the use of different transit or orbit speeds (including programmed acceleration/deceleration profiles) may assist in effecting an optimum calibration or compensation of the instrument. In addition, the path of the mass concentration MC need not be a closed loop as in the case of a circular or ellipsoidal orbit; the mass concentration MC can be oscillated or reciprocated along a path that is not closed and which can include straight segments.

As can be appreciated, the mass concentration MC need not be mounted on the rotating arm assembly as shown in FIGS. 1 and 2, but can optionally be mounted or carried in an independently supported raceway or guideway so that the mass concentration MC is constrained or guided in the raceway as it moves about the instrument.

FIG. 8 illustrates path variants in which the mass concentration MC is positioned between two adjacent instruments so that one mass concentration MC can be used to compensate errors in two instruments. As shown, the mass concentration MC can oscillate or reciprocate along a straight line 20 parallel to the spin axis SA into and through the input plane IP so that the mass concentration MC effectively "plunges" into and out of the input plane IP. As is also shown, a closed orbital path 22 is both ellipsoidal and tilted relative to the equatorial input plane IP. Since the rotating accelerometer gradiometer of the type presented in FIG. 9 effects measurement on opposite sides of the spin axis SA to permit sum and difference common mode rejection, moving the mass concentration MC to the opposite sides of the spin axis SA is preferable; however, restricting the mass concentration MC to an oscillating or reciprocating path on only one side of the instrument will nonetheless allow a measure of signal compensation. While these variants make the determination of the time-varying gradient function more complex, the appropriate functions can nonetheless be extracted from the output spectrum of the gravity gradiometer GGI and processed to provide a calibration or correction function.

The present invention advantageously provides apparatus, system, and methodology by which the signal-to-noise ratio and overall accuracy of a gravity gradiometer can be increased by compensating or correcting for the error contribution of the gradiometer to provide a device that is better-suited for use in sub-surface and sub-ocean natural resource and mineral and hydrocarbon exploration, the detection of sub-surface geologic features, and for use in passive navigation systems for watercraft including submerged water craft.

As will be apparent to those skilled in the art, various changes and modifications may be made to the illustrated real-time self-compensating gravity gradiometer instrument of the present invention without departing from the spirit and scope of the invention as determined in the appended claims and their legal equivalent.

What is claimed is:

1. A self-compensating gravity gradiometer, comprising:
   a gravity gradiometer for sensing gravity gradients and providing a signal output therefrom;
   a mass concentration;
   a transport device moving the mass concentration along a pathway to create a positionally varying gravity perturbation for sensing by the gradiometer; and
   a signal processing path that changes the gradiometer signal output as a function of at least the sensed positionally varying gravity perturbation.

2. The self-compensating gravity gradiometer of claim 1, wherein the gradiometer has an input plane and at least a portion of the pathway is in the input plane.

3. The self-compensating gravity gradiometer of claim 1, wherein the gradiometer has an input plane and the pathway is in the input plane.

4. The self-compensating gravity gradiometer of claim 1, wherein the pathway is a closed path.

5. The self-compensating gravity gradiometer of claim 3, wherein the pathway is a circular orbit in the input plane.

6. The self-compensating gravity gradiometer of claim 2, wherein the transport device comprises a drive motor connected to the gradiometer and to the mass concentration, the drive motor driving the mass concentration in an orbit at least part of which is in the input plane of the gradiometer.

7. The self-compensating gravity gradiometer of claim 1, wherein the signal processing path effects a comparison of the gradiometer signal output corresponding to the positionally varying gravity perturbation as sensed by the gradiometer and a value corresponding to a quantified value of the gravity perturbation and effects a compensation of the gradiometer signal output to at least minimize gradiometer error.

8. A self-compensating gravity gradiometer system, comprising:
   a gravity gradiometer for sensing an ambient gravity gradient and providing an output therefrom;

a mass concentration for creating a quantifiable gravity perturbation and movable through a path with time to cause a positionally moving gravity perturbation for sensing by the gravity gradiometer; and a processing pathway for determining a value representative of a difference between the gradiometer-sensed perturbation and the quantified perturbation and providing a correction value as a function thereof.

9. The self-compensating gravity gradiometer of claim 8, wherein the processing pathway effects a modification of the gradiometer output as a function of the correction value.

10. The self-compensating gravity gradiometer of claim 8, further comprising a transport device for moving the mass concentration through the path with time and having a drive motor connected to the gradiometer and to the mass concentration, the drive motor driving the mass concentration in an orbit at least part of which is in an input plane of the gradiometer.

11. The self-compensating gravity gradiometer of claim 8, wherein the gradiometer has an input plane and at least a portion of the path is in the input plane.

12. The self-compensating gravity gradiometer of claim 11, wherein the path is a circular orbit in the input plane.

13. The self-compensating gravity gradiometer of claim 8, wherein the gradiometer has an input plane and the path is in the input plane.

14. The self-compensating gravity gradiometer of claim 8, wherein the path is a closed path.

15. A method of compensating a gravity gradiometer, comprising:

creating a gravity perturbation in a sensing field of a gradiometer and moving the gravity perturbation thereabout for sensing by the gradiometer to provide an output therefrom that corresponds to the moving gravity perturbation;

calculating a value representative of the value of the gravity perturbation;

comparing the output of the gradiometer corresponding to the gravity perturbation as sensed by the gradiometer and the calculated value to obtain a difference; and compensating the output of the gradiometer by some value that is a function of the compared difference.

16. The method of claim 15, wherein said gravity perturbation is created by a mass concentration.

17. The method of claim 15, wherein said gravity perturbation is moved at least through a sensing plane of the gradiometer.

18. The method of claim 15, wherein said gravity perturbation is moved in a recurring manner along a pre-defined pathway.

19. The method of claim 15, wherein said gravity perturbation is moved in a closed path within the sensing field of the gradiometer.

20. The method of claim 15, wherein said gravity perturbation is moved in a closed circular path within the sensing field of the gradiometer.

21. The method of claim 15, wherein said gravity perturbation is reciprocated in one direction and then the other along a defined pathway.

22. A method of compensating a gravity gradiometer, comprising:

moving a mass concentration in the sensing plane of a gradiometer for sensing by the gradiometer to provide an output therefrom responsive to the moving mass concentration;

providing a theoretical quantified value corresponding to the movement of the mass concentration in the sensing plane of the gradiometer;

comparing the output of the gradiometer corresponding to the moving mass concentration as sensed by the gradiometer and the quantified value to obtain a difference; and compensating the output of the gradiometer by some compensation value that is a function of the compared difference.

23. The method of claim 22, wherein said mass concentration is moved in a recurring manner along a pre-defined pathway.

24. The method of claim 22, wherein said mass concentration is moved in a closed path within the sensing plane of the gradiometer.

25. The method of claim 22, wherein said mass concentration is moved in a closed circular path within the sensing plane of the gradiometer.

26. The method of claim 22, wherein said mass concentration is reciprocated in one direction and then the other along a defined pathway.

27. The method of claim 22, further comprising the step of determining the gravity gradiometer scale factor by dividing the gravity gradiometer output by the quantified value.

* * * * *